Nov. 7, 1961 H. E. HARING 3,007,993
ELECTRODES AND CELLS CONTAINING THEM
Filed March 29, 1945 2 Sheets-Sheet 1

INVENTOR
H. E. HARING
BY
Edwin B. Cave
ATTORNEY

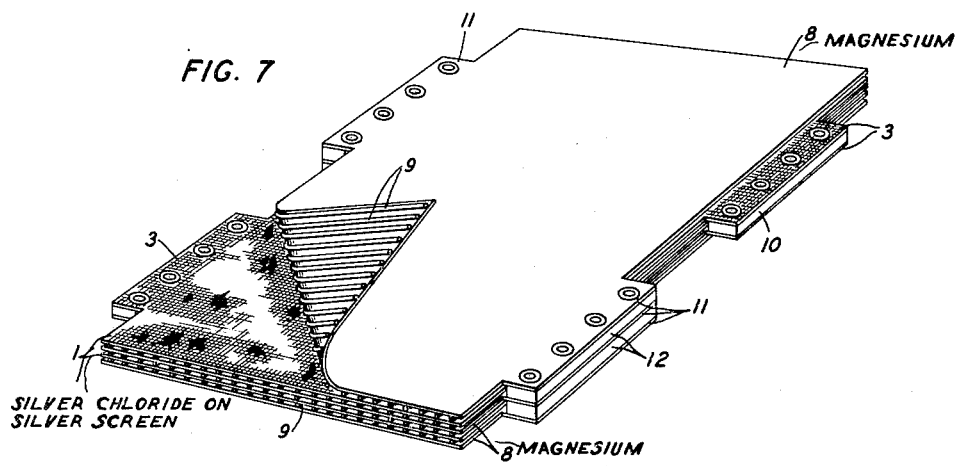
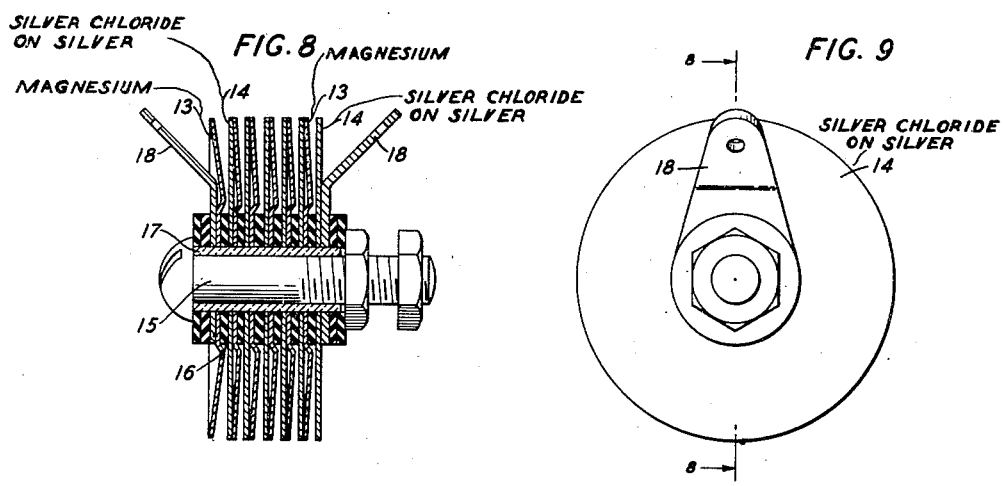
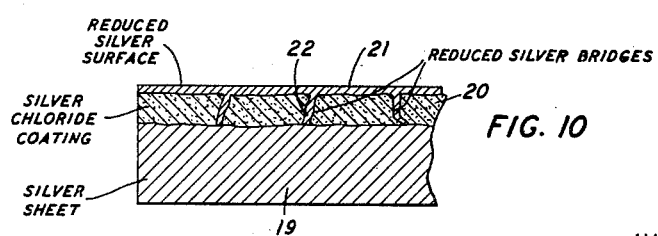

United States Patent Office 3,007,993
Patented Nov. 7, 1961

3,007,993
ELECTRODES AND CELLS CONTAINING THEM
Horace E. Haring, Summit, N.J., assignor to Bell Telephone Laboratories, Incorporated, New York, N.Y., a corporation of New York
Filed Mar. 29, 1945, Ser. No. 585,418
6 Claims. (Cl. 136—100)

This invention relates to electric cells and batteries, or more particularly to structures adapted to function as electric cells or batteries when immersed in sea water or other electrolytes. The invention also relates to novel electrodes for use in such cells and batteries.

Silver chloride electrodes have been proposed as cathodes in electric cells using various electrolytes and anodic materials. When silver chloride functions as an active cathodic material in a cell, the cell functions through the reduction of the silver chloride to metallic silver. Since silver chloride is a substantially non-conductive material, electrodes embodying this substance must have a current-collecting framework of conductive material. Although it is commonly supposed that the reduction of silver chloride to metallic silver takes place directly in the operation of silver chloride cells, it can be demonstrated that the reduction of the electrode takes place through the continuous dissolution of the silver chloride in the electrolyte immediately adjacent to the conductive base and the simultaneous deposition of ions of metallic silver upon the conductive base, the chloride ions remaining in solution.

Therefore, the reduction of a silver chloride electrode must be treated as a plating process. Since the current and also voltage generating ability of the electrode in a cell is dependent upon the rate at which the metallic silver is plated, it is essential that large areas of the conductive framework be exposed to the electrolyte and that large areas of the silver chloride exist in contact with the electrolyte in close proximity to the conductive framework, if a virtually instantaneous peak cell voltage and high current output are required. The electrodes of the present invention, by meeting these conditions are capable of carrying higher current densities than the electrodes hitherto proposed and reach their peak of voltage and current production much more quickly. The structure of these electrodes and of cells and batteries embodying them is illustrated in the accompanying drawings in which FIG. 1 is a front elevation of one form of the electrode of the present invention;

FIG. 7 is a perspective view of an electric cell embodying the cathode of FIG. 1 and having a portion of one of its anode sheets bent upward to show the internal construction;

FIG. 8 is a side elevation, in section, of another form of battery embodying the present invention, the section being taken along the line 8—8 of FIG. 9;

FIG. 9 is a front elevation of the battery of FIG. 8; and

FIG. 10 is a diagrammatic representation of a cross-section of a portion of one of the cathode elements of FIG. 8, the section being taken perpendicular to the plane of the cathode element.

Figure 1:
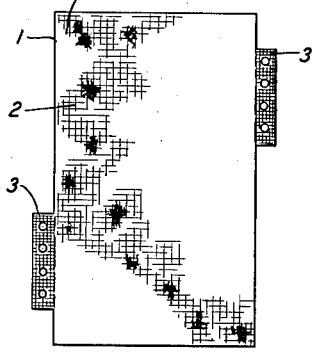

The electrode 1 shown in FIG. 1 is made up of a body 2, consisting of a silver screen coated on both sides with porous silver chloride, the silver chloride having a thin surface layer of conductive reduced porous silver electrically connected to the silver screen by a plurality of fine filamentary conductive bridges of reduced silver, and projecting tabs 3 of uncoated silver screen integral with the silver screen forming the base of the body 2, providing means for forming electrical connections with the electrode.

Figure 6:
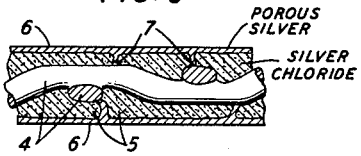
FIG. 6 is a diagrammatic representation in section of the body of FIG. 5 after being subjected to mechanical pressure.

The cross-sectional structure of a portion of the body 2 of the electrode of FIG. 1 is shown in detail diagrammatically in FIG. 6. In FIG. 6, the silver wires 4 of the screen carry a coating 5 of silver chloride which has on its surface a thin conductive layer 6 of porous reduced silver, a plurality of fine filamentary conductive bridges 7 of reduced silver electrically connecting the conductive surface 6 with the silver wires 4. It should be understood that the representation in FIG. 6 is diagrammatic and is not intended to show either true shape or true relative dimensions.

During the operation of a cell containing the electrode represented in FIGS. 1 and 6, silver chloride in the vicinity of the current-collecting framework formed of the wires 4, surface layer 6, and bridges 7, dissolves in the electrolyte and the silver ions so formed are immediately plated out on the conductive framework, leaving the chloride ions in solution. More silver chloride then dissolves and thus the reduction continues. The large surface area and the uniform distribution of the current-carrying capacity of the framework makes possible the plating out of a larger amount of silver in a given time than would be possible with a less efficient current-collecting means. As a result, the electrode is initially able to generate substantially the peak voltage of the cell even at relatively high current densities.

Figure 2:
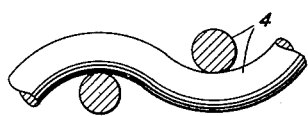
FIG. 2 is a diagrammatic representation in section of a portion of a silver screen prior to treatment for the formation of the electrode of FIG. 1, the section being taken perpendicular to the plane of the electrode.
Figure 3:
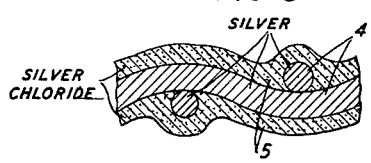
FIG. 3 is a diagrammatic representation in section of the same silver screen after anodizing to form a silver chloride coating.

A series of steps by which the electrode of FIG. 1 may be formed is shown diagrammatically in FIGS. 2 to 6. As the first step, the wires 4 of the screen shown in FIG. 2 are given a coating 5 of porous silver chloride as shown in FIG. 3, in any suitable manner, preferably by anodizing the screen in an aqueous solution containing chloride ions.

The most satisfactory results upon anodizing are obtained if the silver base, and particularly silver screen, is annealed prior to anodizing. Annealing at a temperature of about 600° C. for about 30 minutes has been found suitable.

Any suitable aqueous electrolyte containing chloride ions may be employed in this anodizing operation. An aqueous solution of sodium chloride or hydrochloric acid has been found satisfactory. The concentration of chloride ions in the solution should be sufficient to give the conductivity required for a practical rate of formation of silver chloride. The upper limit of concentration is set only by the value at which the solubility of the silver chloride formed becomes unduly high at the temperature of the solution, so that the rate of deposit of undissolved silver chloride becomes too slow and an undesirable amount passes into solution. Ordinarily, an aqueous solution in which the chloride ions constitute in the vicinity of 2 percent by weight of solution will be found satisfactory.

In order to increase the rate at which the formation of silver chloride takes place, it has been found desirable to heat the electrolyte above room temperatures. Temperatures between about 60° C. and about 80° C., and preferably about 75° C., are the most suitable. The use of elevated temperatures also considerably improves the physical properties of the deposit.

Another expedient which may be employed to decrease still further the time required to form the desired thickness of silver chloride is to add to the electrolyte a low concentration of anions which will form with silver a compound more soluble than silver chloride. Fluoride ions, or preferably nitrate ions, may be employed for this purpose. Nitrate ions may be added in the form of nitric acid at the rate of 5 cc. of concentrated nitric acid per square foot of screen to be anodized.

The anodizing potential and current density are not critcal and the most desirable values can readily be determined by those skilled in the art. A potential of about 18 volts has been found satisfactory for all purposes. The anodizing is continued until slightly more than the desired number of ampere minutes to be generated by the cell have passed through the screen. For the sake of economy and preservation of the mechanical strength of the screen, it is desirable that a screen be chosen which will have between about one-third and one-half of the initial diameter of its wires converted to silver chloride during the anodizing operation.

In order to provide a convenient means for electrical connection to the finished electrode, it is desirable that a portion of the silver base, such as the tabs 3 in FIG. 1, remain uncoated with silver chloride. This is accomplished most simply by coating such portions with a non-conductive lacquer. After the preparation of the electrode has been completed, the lacquer coating may be removed by mechanical means to the extent necessary to permit good electrical contact.

This initial coating of silver chloride may be applied by methods other than anodizing. Any coating procedure which produces a coating which is sufficiently porous to permit electrolytic reduction of the walls of the pores to form the required filamentary bridges of silver which were described above will be suitable. Thus, a suitable silver chloride coating may be formed on silver screen by pressing, preferably hot-pressing, a layer of finely divided silver chloride onto the surface. An adequate coating can also be produced by pasting powdered silver chloride onto a silver screen, onto a silver grid, or onto any other silver base which will retain the silver chloride coating, using a suitable binder for the silver chloride, such as a solution of gum arabic.

The screen coated with silver chloride is then suspended as a cathode in any suitable electrolyte which will not have a harmful effect on the silver chloride coating. This cathodizing operation which is also referred to as "activating" may be carried out simply by reversing the polarity of the electrodes in the bath used for the anodizing operation described above. Preferably, however, the screen is removed from the anodizing bath and suspended as a cathode in an aqueous solution of sodium chloride for the required period of time. A solution containing about 5 percent of sodium chloride has been found very suitable. Obviously, other electrolytes may be employed.

This cathodizing operation is usually carried out at or above the current density at which the cathode is intended to be discharged in the cell in which it is to be employed, so as to insure the ability of the cathode to carry this current density when the action of the cell is initiated. The cathodizing operation is made very brief, usually about four to five seconds, so that only a minimum of the capacity of the electrode is destroyed by reduction of silver chloride to metallic silver.

Figure 4:
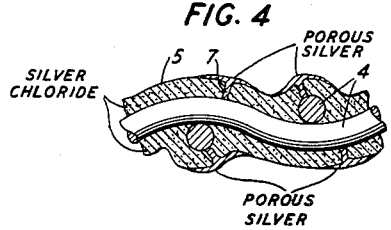
FIG. 4 is a diagrammatic representation in section of the anodized silver screen of FIG. 3 after activating by brief cathodic reduction.

During the cathodic reduction, filamentary bridges 7 of porous metallic silver connecting the wires 4 of the mesh with the outer surface of the silver chloride layer are formed by the reduction of the walls of the pores in the silver chloride coating, as shown in FIG. 4. At the surface of the silver chloride layer, these filamentary bridges tend to spread out, their terminals creating the appearance of snowflakes on the surface of the silver chloride.

The formation of the filamentary bridges follows as a necessary consequence of the cathodic reduction, regardless of the conditions under which this reduction takes place. The initial cathodic reduction must of necessity take place in a region where the silver chloride layer meets the metal base. That this must necessarily occur is apparent from the mechanism of electrolytic reduction of the silver chloride layer.

The reduction of the silver chloride is in reality a plating operation in which the silver chloride passes into solution locally in the electrolyte and in which the silver ions are then plated out of the solution onto the conductive metal base in the immediate vicinity of the silver chloride. Such action can take place only where the electrolyte, a current collecting base having a negative potential and a body of silver chloride, all meet.

Such a situation is found only at the base of the pores in the silver chloride layer. The electrolyte penetrates these pores down to the metal base at which point the plating out of silver from the electrolyte onto the metal base begins. This deposition of reduced silver proceeds upwardly within the pores filling the pores with reduced silver until filamentary bridges have been formed through the silver chloride layer from the metal base up to the outer surface of the silver chloride layer.

Figure 5:
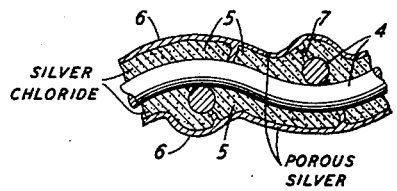
FIG. 5 is a diagrammatic representation in section of the body shown in FIG. 4 after lightly silvering by immersion in a reducing solution.

After the cathodic reduction the screen is then immersed in a suitable reducing agent adapted to reduce chemically the entire outer surface of the silver chloride to a conductive layer 6 of porous silver, as shown in FIG. 5. This reduced surface 6, connected by the bridges 7 to the inner silver wires 4, constitutes a very effective current-collecting framework.

One of the most effective reducing agents for the formation of this conductive layer on the silver chloride is an aqueous solution of hydroxylamine. One reason for the particular effectiveness of this substance is the fact that a quantity of gas is continuously generated at the surface of the silver chloride as a product of the reducing action. The evolution of this gas serves to induce local agitation of the reducing solution, making unnecessary the mechanical agitation required for best results with other reducing agents.

Other suitable reducing agents are aqueous solutions of any of the common photographic developers, such as p-aminophenol, o-aminophenol, amidol (2,4-diaminophenol, hydrochloride), metol (p-methylaminophenol sulfate), catechol, or hydroquinone. The concentrations which are common for photographic developing are suitable and the pH of the solutions should be adjusted as in photographic developing solutions. Immerison for 1 to 3 minutes is ordinarily satisfactory. The exact time depends upon the dilution, temperature and age of the developing solution.

A particularly effective reducing solution of the photographic developer type contains, in each liter of aqueous solution, approximately 1.5 grams of hydroquinone, 0.5 gram of elon (p-methylaminophenol sulfate), 6 grams of anhydrous sodium sulfite and 9 grams of anhydrous sodium carbonate.

In order to consolidate and impart mechanical strength to the silver-surfaced silver chloride coating, the screen is subjected to a high mechanical pressure, such as three to four tons per square inch, to form a compact electrode.

In a typical case, the total thickness of the electrode is reduced by about one-third during this pressing operation. The finished electrode has the appearance of a solid silver sheet flecked with silver snowflakes caused by the arrangement of the terminals of the silver bridges, as illustrated in FIG. 1. As indicated above, the cross-sectional appearance of the finished sheet is represented diagrammatically in FIG. 6.

This pressing operation which imparts mechanical strength to the silver chloride coating may be performed at any time after the anodizing operation. Thus, the electrode may be subjected to mechanical pressure immediately after anodizing and before the subsequent reducing operations, or it can be pressed after the cathodic reduction and before the chemical surface reduction, or it can be pressed after all three operations have been completed. When the initial silver chloride coating is applied by a procedure, other than anodizing, which yields a compact, mechanically durable layer of silver chloride, it is obvious that no further pressing operation is required.

The above-described method of producing electrodes is more particularly described and claimed in the copending application of H. E. Haring, Serial No. 585,417, filed on the same day as the present application.

The resulting electrode, when combined with a suitable anode, such as a magnesium anode, forms a particularly useful cell capable of generating relatively high current densities, even with dilute electrolytes, such as sea water. A structure capable of functioning as such a cell when immersed in sea water or other electrolyte is illustrated in FIG. 7. The cell shown in this figure is made up of alternately disposed, suitably spaced cathode sheets 1 and anode sheets 8. In order to space and insulate the electrodes from one another while permitting free circulation of the electrolyte in the spaces between them, a plurality of spacer elements 9 are provided.

The spacer elements 9 comprise spaced filaments of an insulating material having a diameter equal to the desired spacing between the electrodes of the cell. Preferably these filaments are formed of nylon, although obviously any sufficiently strong, durable, inert insulating material would be suitable. These spacer filaments are securely fastened at regular intervals to the faces of the anode sheets 8. Those anode sheets situated in the interior of the pile constituting the cell have spacer filaments fastened to both surfaces, whereas those anode sheets disposed at the two surfaces of the pile have spacer filaments fastened only to the inner surfaces. These filaments are preferably disposed so that they are substantially parallel to one another and to one edge of the anode sheets so that the electrolyte may circulate freely. The filaments may be secured to the anode sheets by any suitable adhesive, preferably the commercially available nylon cement.

The spacers may be advantageously applied to the anode sheets by stringing the filaments in their proper arrangement upon an open frame larger than the sheet, applying an adhesive to the filaments, bringing the face of the anode sheet firmly against the filaments, and maintaining the sheet in this position until the adhesive has dried. The filaments may then be cut off even with the edge of the sheet by any suitable means, such as a hot wire.

The cathode sheets are connected together in parallel by means of tabs 3 which protrude beyond the active surface of the electrode. Conductive metal elements 10 are inserted between the tabs to take up the space between successive cathode sheets caused by the intervening anode sheet and spacers. The tabs 3 and conductive elements 10 are fastened together by any suitable means, such as rivets. The anode sheets 7 are connected together in parallel in a similar manner by means of projecting tabs 11 and intervening metal elements 12. To lead off the generated current, suitable conductors (not shown) are fastened in any suitable manner to the tabs 3 and 11.

The structure described above may be preserved indefinitely in a dry state. When it is to be used, it is immersed in a suitable electrolyte. The electrolyte is circulated through the spaces formed by the filament spacers 9, causing the cell to function. Because of the close spacing of electrodes made possible by the construction described, a high current density may be achieved within the cell without excessive drop in terminal voltage when a dilute electrolyte is employed. Therefore, the structure described is well suited for use where sea water is the electrolyte.

A desirable cell using a sea water electrolyte employs an anode of magnesium or a predominantly magnesium alloy. Preferably a magnesium alloy containing a small proportion of aluminum is used since the presence of aluminum appears to prevent the precipitation on the anodes of insoluble magnesium salts which are formed during the operation of the cell. A very suitable commonly available alloy for this purpose is made up of about 6.5 percent aluminum, about 1 percent zinc, about .2 percent manganese, and the remainder magnesium. For the conservation of weight and volume, the anode sheets are preferably as thin as is practicable on the basis of electrochemical requirements, strength and commercial availability. Sheets 14 mils in thickness have been found very satisfactory, although obviously thicker or somewhat thinner sheets may be found suitable.

In order that the full cell voltage may be reached as quickly as possible after immersion in the electrolyte and application of the load, it is necessary that all surface contamination which would retard the interaction of electrolyte and anode be removed prior to the assembly of the cell. This may be done conveniently by a simple abrading of the surface of the magnesium, as with a stiff steel wire brush. If a wet cleaning operation is employed, particularly one involving acid etching, an oxide film is formed which retards rapid generation of the cell voltage. This film can be removed by abrading as above or by subjecting the magnesium to a chromating treatment, such as is commonly employed for protecting magnesium from atmospheric corrosion.

The most suitable chromating treatment has been found to consist of immersion of the magnesium for one-half hour at room temperature in an aqueous solution containing 8 ounces of $MgSO_4 \cdot 7H_2O$ and 5.3 ounces of $Na_2Cr_2O_7 \cdot 2H_2O$ per gallon of solution, adjusted to a pH of 3.0 by means of sulfuric acid. This treatment forms a bronze-colored protective film on the surface of the magnesium which tends to protect it from atmospheric corrosion but does not retard the rapid generation of cell voltage.

Whenever the battery is to be stored under conditions where the magnesium anodes would be subjected to atmospheric corrosion, the batteries should be stored in a sealed container, preferably containing a suitable desiccant. Vacuum packing may be employed if extremely rapid filling is required.

Because of its uniform operating characteristics, its ability to operate at high current densities wtih a sea water electrolyte, and its high power and energy output per unit of weight and volume, the cell shown in FIG. 7 is well suited for the propulsion of navel torpedoes. To illustrate the compactness of cells of this type, these cells may be formed of magnesium anode sheets of a thickness of 14 mils, cathode sheets of a thickness of 22 mils, and filament spacers 15 mils in diameter. Cells of this type may conveniently be operated at a current density of one to two amperes per square inch of electrode surface. Thus, if a cell contains, for instance, six cathode sheets, both sides of which are used, as in FIG. 7, and if the working area of each side of each cathode sheet is, for instance, 8 inches by 10 inches, the total thickness of the cell will be less than ½ inch and the current delivered, if the cell is operated at 1.5 amperes per square inch will be 1440 amperes. This is equivalent to approximately 1.5 kilowatts of power at the operating voltage.

It is necessary for successful operation at high current densities that there be adequate, continous circulation of electrolyte through the spaces between cathode and anode sheets. When a cell, such as that in FIG. 7, is positioned in the electrolyte with the spacer filaments vertically disposed, continuous circulation of the sea water or other electrolyte upward through the cell is maintained by the generation of hydrogen as the product of a side reaction between the freshly exposed magnesium surfaces of the anode and the water of the electrolyte. This gas, as it is generated, carries the electrolyte upward and out of the cells allowing fresh electrolyte to enter. Adequate circulation of electrolyte not only cools the cells but also prevents the deposit of insoluble magnesium salts on the anodes. In some instances, this inherent circulation may be found inadequate and forced circulation may be necessary. In the case of a torpedo this can be readily obtained with an internal scoop.

An electrode has been described above, which utilizes a silver screen as a base. Any other base of silver or other metal having a silver surface layer of sufficient thickness may be employed. Thus, a perforate or imperforate sheet of silver may be given an active layer of silver chloride having a conductive porous silver surface electrically connected to the silver base by silver bridges in the same manner as described above for silver screen. A battery structure embodying a cathode having a base of imperforate silver sheet is illustrated in FIG. 8.

The battery shown in FIGS. 8 and 9 is made up of a plurality of circular anode discs 13 and cathode discs 14 having a central hole and mounted on an insulated bolt 15. These anode and cathode discs are mounted alternately in pairs, each pair constituting a cell. The anode and cathode discs of each cell are insulated from one another by insulating discs 16. The anode sheet of each cell is in electrical and mechanical contact with the cathode sheet of the next succeeding cell. The anode discs 13 are provided with a slight curvature, as shown, so that their periphery presses firmly against the cathode discs of the preceding cells, thus excluding electrolyte from between these respective members to avoid the setting up of an internal cell action. An insulating sleeve 17 separates the electrodes from the bolt 15 on which they are mounted.

Any number of cells may be mounted on the circular bolt in series, as shown, in order to give the desired voltage. If desired, any number of batteries may be mounted on the same bolt in a series or parallel arrangement. Lugs 18 are mounted at each end of the battery to provide convenient means for electrical connection. This battery functions when immersed in an electrolyte, such as sea water. Although there is some loss of power due to leakage between cells through the electrolyte, this is not a significant factor in most uses to which a battery of this type would be put.

As anode discs, magnesium treated as described above may be employed. The cathode discs are made up of silver sheets which are bare on the side which makes contact with the next succeeding cell, but which have on the surface facing the interior of the cell a coating of silver chloride having a conductive silver surface layer electrically connected to the silver sheet by silver bridges as described above. A section of a portion of one of the cathodes, taken perpendicular to the plane of the disc, is shown diagrammatically in FIG. 10. It can be seen that the silver base 19 has a silver chloride coating 20 with a reduced silver surface 21 and reduced silver bridges 22 similar in structure to the active coating shown in FIG. 6.

The batteries shown in FIGS. 8 and 9 are more particularly described and claimed in the copending application of R. L. Taylor, Serial No. 585,419, filed on the same day as the present application.

The silver chloride electrodes of the present invention have been described as used with magnesium anodes and sea water electrolytes, now United States Patent No. 2,590,584. Obviously other anode materials, such as aluminum and zinc may be used. It is obvious that the cells and batteries of the present invention will operate in electrolytes other than sea water. For instance, any aqueous soltuion of sodium chloride, such as a 3.5 percent aqueous solution, may be employed. It is also apparent that any other alkali metal chloride or alkaline earth metal chloride will be satisfactory. Any other suitable electrolyte in aqueous solution, weak or strong, dilute or concentrated, may be employed.

Water containing no dissolved electrolytes also yields an operative cell although considerable time may be required before the cell reaches its full power. When pure water is used, the initial conductivity of the water is sufficient to start the operation of the cell at a low level and the resulting formation of dissolved magnesium salts results in an autocatalytic action which continuously increases the conductivtiy of the liquid.

The advantages of the type of electrode structure described above, wherein a porous conductive metal surface is connected electrically to a metal base by means of filamentary metal bridges extending through an active cathodic material, will be obtained when the active cathodic material is some other relatively insoluble or sparingly soluble non-conductive silver compound, such as silver oxide, silver chromate, silver sulfate, silver phosphate, silver acetate, silver citrate, or silver carbonate. In general, for cells which are to carry to relatively high current density, a silver salt at least as soluble as silver chloride is required. The solubility, however, should be sufficiently small so that mechanical destruction of the electrode will not occur through dissolution when the electrode is immersed in the electrolyte. The same type of electrode structure is also advantageous where metal bases carrying active cathodic metal compounds other than silver compounds are employed.

Although the invention has been described in terms of its specific embodiments, certain modifications and equivalents will be apparent to those skilled in the art and are intended to be included within the scope of the present invention, which is to be limited only by the reasonable scope of the appended claims.

What is claimed is:

1. An electrode for an electric cell comprising a silver base, a layer of silver chloride on the surface of said base, a thin layer of porous reduced metallic silver on the outer surface of said silver chloride layer and a plurality of filamentary bridges of reduced metallic silver extending between and electrically connected to the metal base and the outer layer of metallic silver.

2. An electrode for an electric cell comprising a metal base, a layer of silver chloride on the surface of said metal base, and a plurality of filamentary bridges of reduced metallic silver extending from the metal base to the outer surface of the silver chloride.

3. An electrode for an electric cell comprising a metal base, a layer of a sparingly soluble silver compound on the surface of said metal base, said silver compound being selected from the group consisting of silver chloride, silver oxide, silver chromate, silver sulphate, silver phosphate, silver acetate, silver citrate and silver carbonate, a thin layer of porous reduced metallic silver on the outer surface of said layer of silver compound and a plurality of filamentary bridges of reduced metallic silver extending between and electrically connected to the metal base and the outer layer of metallic silver.

4. An electric cell comprising a magnesium anode and a cathode comprising a silver base, a layer of silver chloride on the surface of said base, a thin porous layer of reduced metallic silver on the outer surface of said silver chloride layer and a plurality of filamentary bridges of reduced metallic silver extending between and electrically connected to the silver base and the outer layer of metallic silver.

5. An electric cell comprising an anode, a sea water electrolyte and a cathode comprising a silver base, a layer of silver chloride on the surface of said base, a thin porous layer of reduced metallic silver on the outer surface of said silver chloride layer and a plurality of filamentary bridges of reduced metallic silver extending between and electrically connected to the silver base and the outer layer of metallic silver.

6. An electric cell comprising a magnesium anode, a sea water electrolyte and a cathode comprising a silver base, a layer of silver chloride on the surface of said base, a thin porous layer of reduced metallic silver on the outer surface of said silver chloride layer and a plurality of filamentary bridges of reduced metallic silver extending between and electrically connected to the silver base and the outer layer of metallic silver.

References Cited in the file of this patent

UNITED STATES PATENTS

| | | |
|---|---|---|
| 270,551 | Mackenzie | Jan. 9, 1883 |
| 403,451 | Barrett | May 14, 1889 |
| 1,304,192 | Morrison | May 20, 1919 |
| 1,639,280 | Benner et al. | Aug. 16, 1927 |
| 2,428,850 | Lawson | Oct. 14, 1947 |